US 9,578,798 B2

United States Patent
Scheideler (10) Patent No.: US 9,578,798 B2
(45) Date of Patent: Feb. 28, 2017

(54) SCRAPING DEVICE, SEED METER AND SINGLE GRAIN SOWING MACHINE

(71) Applicant: Kverneland AS, Kvernaland (NO)

(72) Inventor: Bernhard Scheideler, Beverungen (DE)

(73) Assignee: Kverneland AS, Kvernaland (NO)

( * ) Notice: Subject to any disclaimer, the term of this patent is extended or adjusted under 35 U.S.C. 154(b) by 30 days.

(21) Appl. No.: 14/436,998

(22) PCT Filed: Dec. 19, 2013

(86) PCT No.: PCT/EP2013/077459
§ 371 (c)(1),
(2) Date: Apr. 20, 2015

(87) PCT Pub. No.: WO2014/108296
PCT Pub. Date: Jul. 17, 2014

(65) Prior Publication Data
US 2015/0250093 A1 Sep. 10, 2015

(30) Foreign Application Priority Data
Jan. 8, 2013 (DE) .................. 10 2013 100 118

(51) Int. Cl.
A01C 7/04 (2006.01)
A01C 7/20 (2006.01)

(52) U.S. Cl.
CPC .............. *A01C 7/046* (2013.01); *A01C 7/20* (2013.01)

(58) Field of Classification Search
CPC .......... A01C 7/046; A01C 7/20; B65G 59/115
(Continued)

(56) References Cited

U.S. PATENT DOCUMENTS

| 691,877 A | * | 1/1902 | Scott .................... B07B 13/003 |
| | | | 209/616 |
| 4,688,698 A | | 8/1987 | Holland ....................... 221/211 |

(Continued)

FOREIGN PATENT DOCUMENTS

| FR | 2 971 391 | 8/2012 | ............... A01C 7/04 |
| WO | WO 2012/168580 | 12/2012 | ............... A01C 7/04 |

OTHER PUBLICATIONS

International Search Report from corresponding International Patent Application No. PCT/EP2013/077459, dated Aug. 8, 2014.

*Primary Examiner* — John G Weiss
(74) *Attorney, Agent, or Firm* — Kusner & Jaffe (57) ABSTRACT

Sowing heart for a single-grain sowing machine comprising: a sowing disk rotatable in a rotational direction R, the sowing disk having at least two sowing hole series, arranged concentrically to the sowing disk, with sowing holes, a receiving area for receiving seed at the sowing holes and a dispensing area for dispensing seed, in front of the dispensing area, a wiping device is provided for singulating seed at the sowing holes during the operation of the sowing heart, which has a first wiping element for the first sowing hole series and a second wiping element for the second sowing hole series, whereby the wiping elements are coupled and are designed to be adjustable with respect to one another. In addition, the invention relates to a single-grain sowing machine with a considerable number of sowing aggregates, in each case with an above-mentioned sowing heart and a corresponding wiping device.

19 Claims, 10 Drawing Sheets

(58) Field of Classification Search
USPC .......... 111/183–185, 181; 221/211, 221, 224
See application file for complete search history.

(56) References Cited

U.S. PATENT DOCUMENTS

| | | | | |
|---|---|---|---|---|
| 4,793,511 | A | * 12/1988 | Ankum | .................. A01C 7/046 |
| | | | | 111/77 |
| 5,848,571 | A | 12/1998 | Stufflebeam et al. | ........ 111/185 |
| 6,615,754 | B2 | * 9/2003 | Unruh | .................... A01C 7/046 |
| | | | | 111/181 |
| 7,093,548 | B2 | * 8/2006 | Eben | ...................... A01C 7/046 |
| | | | | 111/185 |
| 9,137,942 | B2 | * 9/2015 | Adams | .................... A01C 7/10 |
| 2002/0170476 | A1 | 11/2002 | Bogner et al. | ................ 111/183 |
| 2015/0181798 | A1 | * 7/2015 | Schumacher | .......... A01C 7/046 |
| | | | | 111/185 |

* cited by examiner

SCRAPING DEVICE, SEED METER AND SINGLE GRAIN SOWING MACHINE

FIELD OF THE INVENTION

The invention relates to a sowing heart, a wiping device, and a single-grain sowing machine.

BACKGROUND OF THE INVENTION

Known sowing hearts for pneumatic single-grain sowing aggregates consist in general of two halves, namely a rear part, in which the mount of the sowing disk and the negative pressure area are installed, and a front part, into which the lower outlet of the seed container leads and which itself has a seed reservoir.

In sowing holes of the sowing disk matched to the size of the seed, which holes are arranged at specific intervals on a circle as a sowing hole series, individual grains of seed are removed from the seed reservoir and thrown off in a dispensing area by interrupting the negative pressure. If the interruption of the negative pressure is not sufficient to ensure dropping, an automatic wiper is provided at a short distance behind the ideal dropping spot. Per sowing disk, several sowing hole series can be arranged in circles of the sowing disk that are separated from one another.

In order to drop only one grain of seed if possible with each dropping, singulating devices are provided for each sowing hole series. In the case of a single seed, these devices work relatively reliably but hit their limits specifically in the case of tough seed, for example carrot seeds.

SUMMARY OF THE INVENTION

The object of this invention is therefore to provide a wiping device and a sowing heart with a wiping device as well as a corresponding single-grain sowing machine, with which a reliable singulation of the seed, even in the case of complicated seed, is made possible.

This object is achieved with a sowing heart, a wiping device and a single-grain sowing machine, as defined by the independent claim(s). Advantageous further developments of the invention are indicated in the subclaims. All combinations of at least two features disclosed in the specification, the claims and/or the figures fall within the scope of the invention.

The basic idea of this invention is to provide a wiping device with at least two wiping elements that can be attached together and can be adjusted to one another for wiping surplus seed at sowing holes. During the operation of the sowing heart, the wiping elements wipe by rotation of the sowing disk along the sowing holes arranged on the sowing hole series. In this case, the wiping elements are arranged in such a way that only surplus seed is removed from each sowing hole; in each case, however, one grain of seed per sowing hole gets stuck. As a result of the wiping elements being able to be adjusted with respect to one another, but at the same time being able to be fixed on one another or relative to one another, an optimal adjustment of the two wiping elements relative to the sowing hole series of the sowing disk is possible.

Within the scope of this disclosure and under the term seed, for example, fertilizer, grains, whether processed or in raw form, can be subsumed.

According to an advantageous embodiment of the invention, it is provided that the wiping elements can be designed to be adjustable with respect to one another, in particular exclusively, in the radial direction of the sowing disks and parallel to the sowing disk. In this respect, the setting of the wiping elements is greatly simplified, since the degrees of freedom of the adjustment of the wiping elements in the radial direction are limited to the sowing disk. The setting or adjustment within the radial direction is decisive for the optimal singulating of the seed at the seed holes.

The function of the wiping elements is further improved by having the latter be spring-loaded, in particular together, in a direction orthogonal to the sowing disk. Thus, it is prevented that flat seed moves under the wiping elements or the function of the wiping elements would no longer be ensured because of wear and tear of the wiping elements. Thus, a long-lived operation of the wiping elements and thus the sowing heart with larger maintenance intervals is possible.

In further development of the sowing heart according to the invention, it is provided that the wiping elements can be designed to be adjustable with respect to one another by a conversion of a rotational motion of an adjustment device into a translational motion of the wiping elements in the radial direction. In this way, the adjustment, in particular by an electric motor, can be automated.

In this case, it is advantageous, according to the invention, when for the adjustment of the wiping elements, in particular in the radial direction and/or with respect to the contact pressure at the sowing disk, a control circuit is provided. As a set value, in particular the signal of an evaluation/detection of the sowing holes, preferably video monitoring, is used. The video monitoring is performed in particular by a monitoring device that is integrated in the sowing heart in such a way that the monitoring of seed production can be done directly in the organ responsible for the singulating, namely the sowing heart. In this case, another aspect of this invention is to provide the monitoring in an economical, quickly-responding and compact manner by a line scan camera, in particular by pure contrast measurement. It is especially advantageous in this invention that the monitoring can be carried out only on one side of the sowing disk, namely in particular by reflection measurement. In other words: electromagnetic waves directed from a radiation source to the sowing disk are reflected by the sowing disk and detected by the line scan camera after reflection, specifically in the area in which the seed is conveyed to the sowing disk. The line scan camera is focused corresponding to the reflective surface of the sowing disk, and the pulses produced by the line scan camera are evaluated by an evaluating unit, whereby clearly different pulses are obtained at the sowing holes depending on whether zero or one or two sowing grains adhere to the sowing hole. Thus, the coating of each sowing hole immediately after detection, i.e., in-line, can be evaluated and can serve as a correcting value for the control circuit for adjusting the wiping elements.

According to another advantageous embodiment of the invention, it is provided that the first wiping element has a first holding plate and a first wiper that is attached, in particular removably, on the first holding plate, and the second wiping element has a second holding plate and a second wiper that is attached, in particular removably, on the second holding plate.

Thus, the wiping elements can be integrated in a compact manner optimally in a working space of the sowing heart despite the enhanced functionality of the wiping elements.

In this case, it is especially advantageous when the second holding plate is designed to run through the first holding plate.

The wiping elements are further developed according to the invention by the second holding plate, in particular with an outside contour of the second holding plate at an inside contour of the first holding plate, being guided to slide along the first holding plate in the radial direction of the sowing disk. Thus, an expensive mechanism can be eliminated, so that the production of the wiping device is simple, and a long-lived operation can be ensured without maintenance of the wiping device being necessary.

By the first holding plate and/or the second holding plate at the reverse sides facing away from the wipers having spring elements for spring-loading the first wiping element and/or the second wiping element, the above-described advantages of a spring can also be integrated in the sowing heart in a simple and compact way.

In another advantageous embodiment of the invention, it is provided that the first holding plate has a first actuator intake for receiving a first actuator of the adjustment device, and the second holding plate has a second actuator intake for receiving a second actuator of the adjustment device. The actuators can preferably be designed as pins that engage in corresponding recesses in the holding plates, in particular designed as slots.

In this case, it is of special advantage when the first actuator and/or the second actuator are arranged in a manner that in particular can be controlled separately and rotated eccentrically on the adjustment device. The adjustment thus is done with simple mechanical means, which are maintenance-free and can be controlled exactly.

In further development of the wiping elements according to the invention, it is provided that the first wiper has a first runner and is connected to the first holding plate by at least two arms that are separated from one another and/or the second wiper has a second runner and is connected to the holding plate by at least two arms that are separated from one another. According to the invention, it is also conceivable that one of the two wipers is connected to only one arm, in particular the wiper, which is attached to the second holding plate, if the latter is designed to run through the first holding plate.

In this case, it is of special advantage for the function of the wiping device when the first runner and/or the second runner, in particular in the opposite direction, are prestressed relative to a plane defined by the sowing disk and/or each have a curvature running in particular in the opposite direction. The contact pressure of the wipers produced by the curvature or prestressing, in particular at a front edge arranged against the rotational direction of the sowing disk, minimizes the problem that the seed will go under the wiper and jam there and may cause a malfunction.

It is especially advantageous when the curvature is uniform along the runners.

As an independent invention, a wiping device as well as a single-grain sowing machine are also disclosed, whereby features of the sowing heart and/or features of the wiping device and/or features of the single-grain sowing machine are to be considered as disclosed in each case and as transferable to the other invention.

BRIEF DESCRIPTION OF THE DRAWINGS

Additional advantages, features and details of the invention follow from the description below of embodiments that are preferred as well as based on the drawings. The latter show in.

In the figures, the same components and components with the same function are identified with the same reference numbers.

DETAILED DESCRIPTION OF THE INVENTION

Figure 1A:
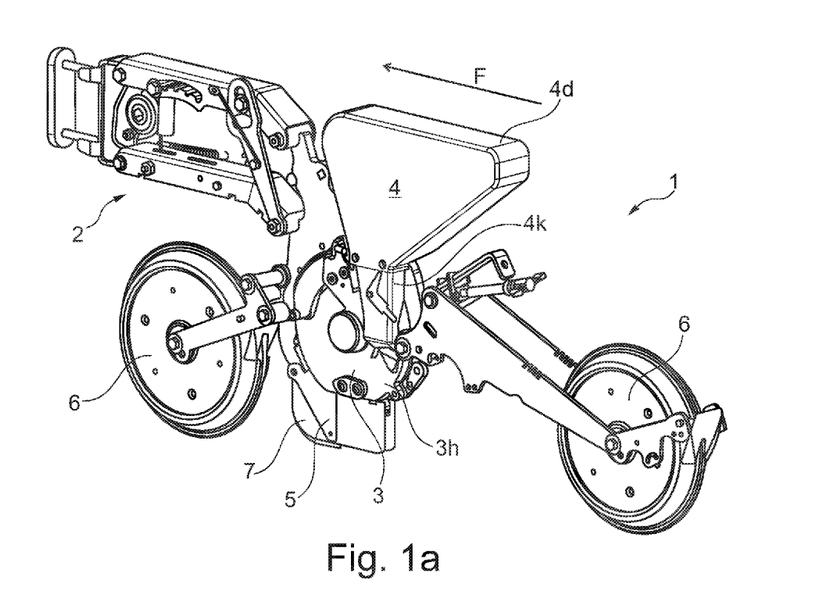
FIGS. 1a and 1b: Perspective views of a single-grain sowing aggregate of a single-grain sowing machine according to the invention obliquely from the rear (FIG. 1a) and obliquely from the front (FIG. 1b)
Figure 1B:
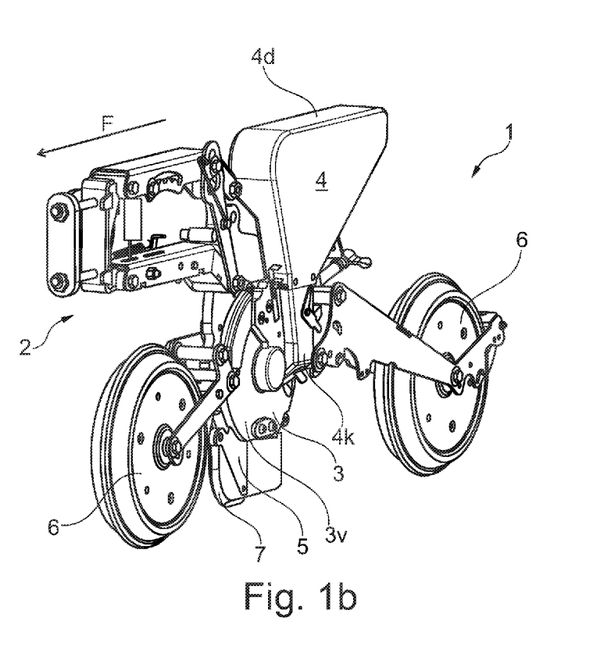

In FIGS. 1a and 1b, a sowing aggregate 1 of a single-grain sowing machine according to the invention is depicted, which sowing aggregate is fastened via an arm 2 to the frame of the single-grain sowing machine. Consequently, the direction of travel during operation of the single-grain sowing machine is in the direction indicated by the arrow F.

A sowing heart 3, a tank 4 arranged above the sowing heart 3, a sowing coulter 5 arranged below the sowing heart 3, as well as two blade wheels 6 that can pivot relative to the sowing heart 3 and that are arranged in the direction of travel F in front of and behind the sowing heart 3 are attached at the arm 2, which allows a pivoting motion, preferably as a vertical motion by designing the arm 2 as a parallelogram arm.

The tank 4 can be closed by a cover 4d and can be filled with seed, which in turn is guided laterally into the sowing heart 3 via a channel 4k.

The seed is singulated in the sowing heart 3 and is laid down via the sowing coulter 5 in a furrow in the farmland opened by a coulter tip 7 of the sowing coulter 5.

Figure 2A:
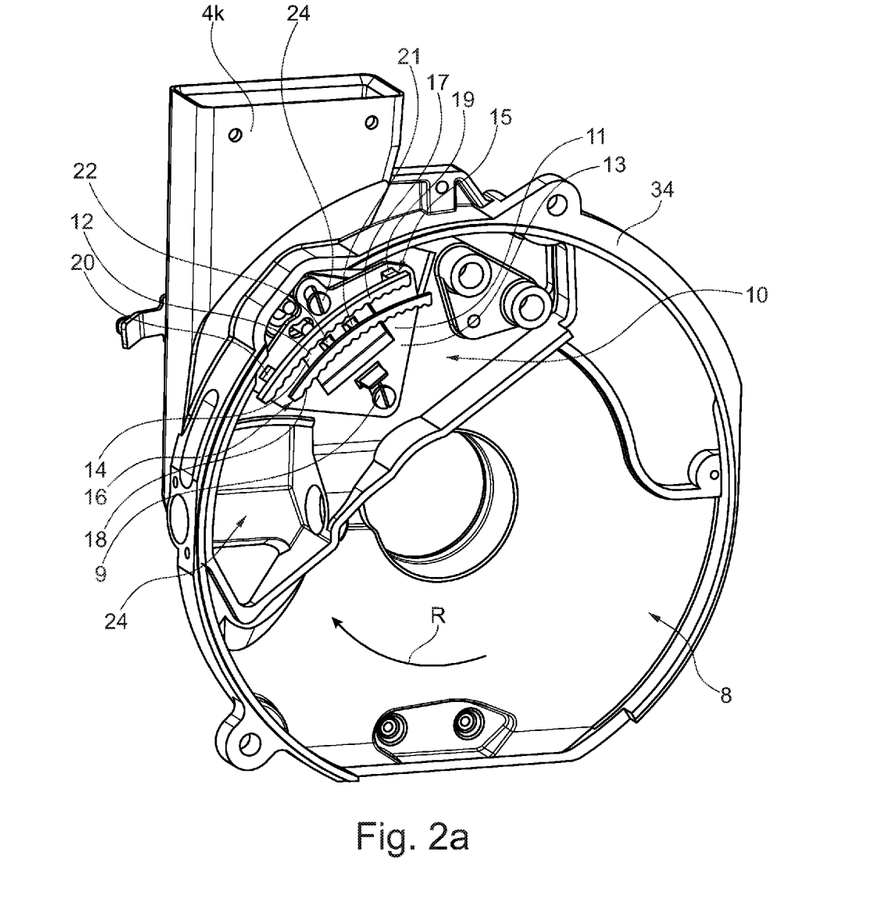
FIGS. 2a and 2b: Perspective views of a half of a sowing heart according to the invention.
Figure 2B:
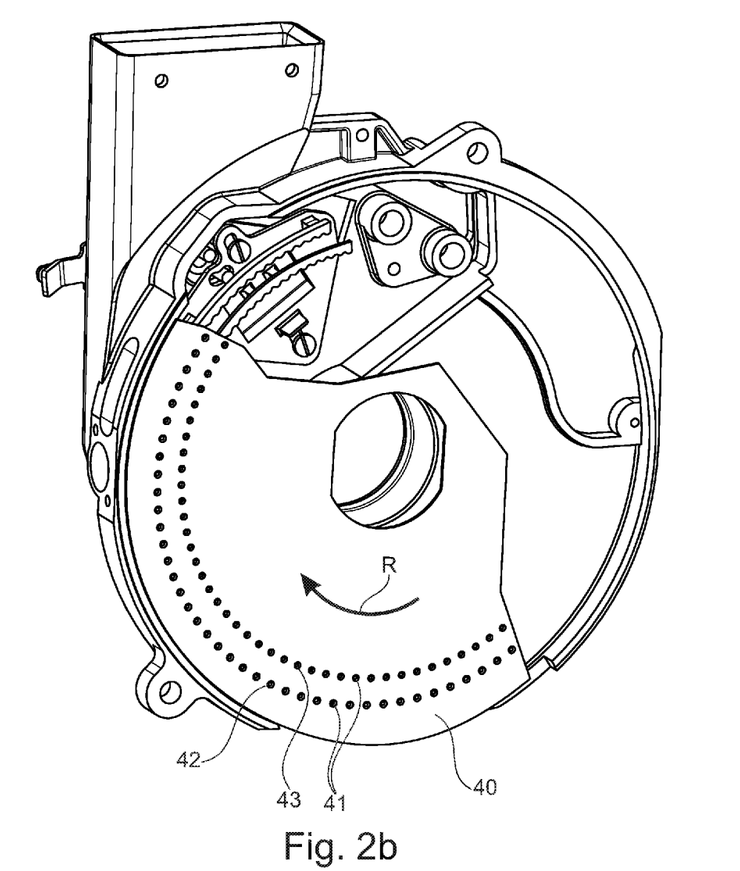

In FIGS. 2a and 2b, the inner workings of a half 3h of the sowing heart 3, shown in FIG. 1a, are depicted, while the inner workings of the corresponding half 3v (see FIG. 1b) are not depicted. A working space 8 enclosed by the two halves 3h and 3v is divided by a sowing disk 40 into a pressure chamber and a seed chamber.

The pressure chamber is divided up by a sealing ring into a negative pressure area and a normal pressure area. In this case, the essential point is that a pressure difference, which is resolved in the normal pressure area, prevails in the negative pressure area at sowing holes 41 of the sowing disk 40 that are used for receiving and dispensing seed, whereby the seed is thrown off when passing over the sowing holes 41 from the negative pressure area into the normal pressure area and by rotational motion of the sowing disk 40 in a rotational direction R of the sowing disk 40.

The negative pressure area is supplied with negative pressure by a pump, not shown, or a negative pressure blower.

The sowing holes 41 are arranged divided into two sowing hole series 42, 43, in particular running parallel, in one concentric circular path each of the sowing disk 40 at defined intervals on the periphery of the sowing disk 40.

The decisive component for this invention, namely a wiping device 10, is arranged in the working space 8 in the rotational direction R behind an intake 9 of the channel 4k. At this point, the sowing holes 41 are already provided with seed by the negative pressure prevailing at the sowing disk 40. The wiping device 10 is used to cingulate sowing holes 41 provided in multiple ways with grains of seed, so that in the ideal case, exactly one grain of seed adheres to each sowing hole 41.

The wiping device 10 has two wiping elements 11, 12 that can move against one another. The first wiping element 11 is comprised of a first holding plate 13, which is fastened by fastening means 24 with two degrees of freedom to the half 3h of the sowing heart 3. One degree of freedom is in the radial direction of the sowing disk 40, and the second degree of freedom is in the axial direction to the sowing disk 40, i.e., orthogonal to the sowing disk 40. The degree of freedom in the axial direction is preferably limited by spring means.

Figure 3A:
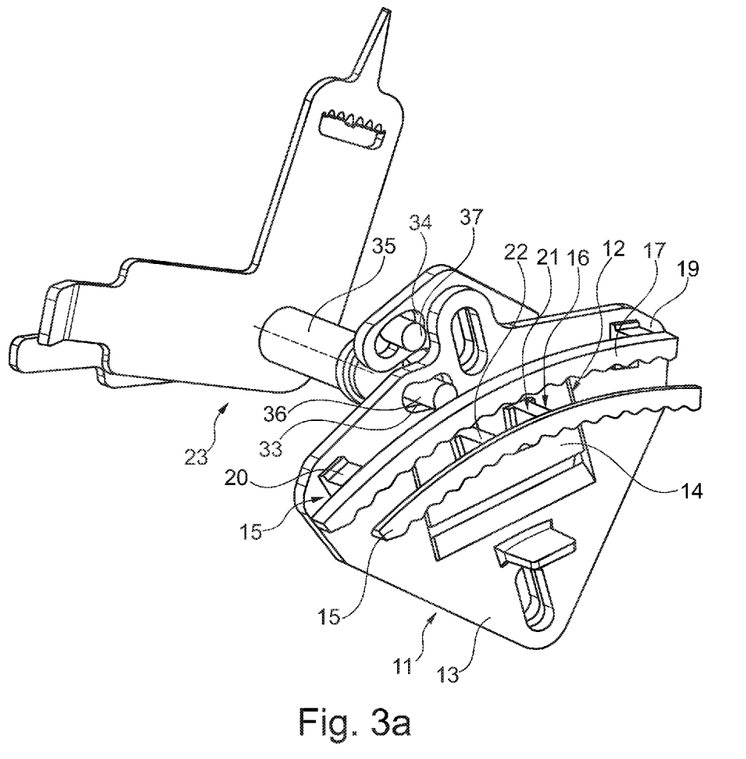
FIGS. 3a and 3b: Perspective views of a wiping device according to the invention obliquely from the front (FIG. 3a) and obliquely from the rear (FIG. 3b)
Figure 3B:
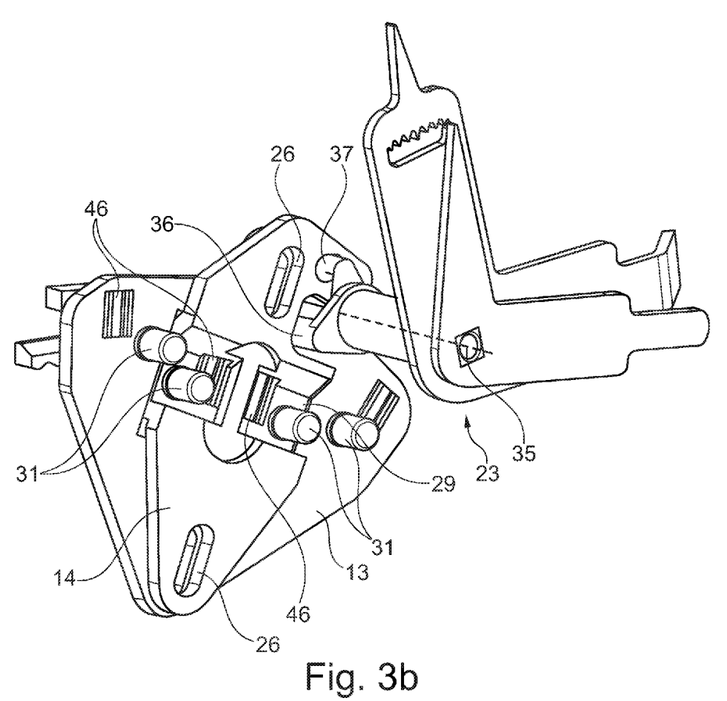

In the rotational direction of the sowing disk 40, the first holding plate 13 and thus the first wiping element 11 do not have any degree of freedom. The degree of freedom in the radial direction is limited in particular in that the fastening means are designed as screws, along whose shaft the first wiping elements 11 are guided into slots 25 corresponding to the fastening means 24. The slots 25 are arranged aligned with one another, in particular at an upper end and a lower end of the first holding plate 13.

On its side facing the sowing disk 40, the first wiping element 11 has a first wiper 15 that is in particular runner-like. The latter is preferably formed from a first runner 17, which can be clipped via two arms 19, 20 to the first holding plate 13 (see FIGS. 5a and 5b).

Figure 5A:
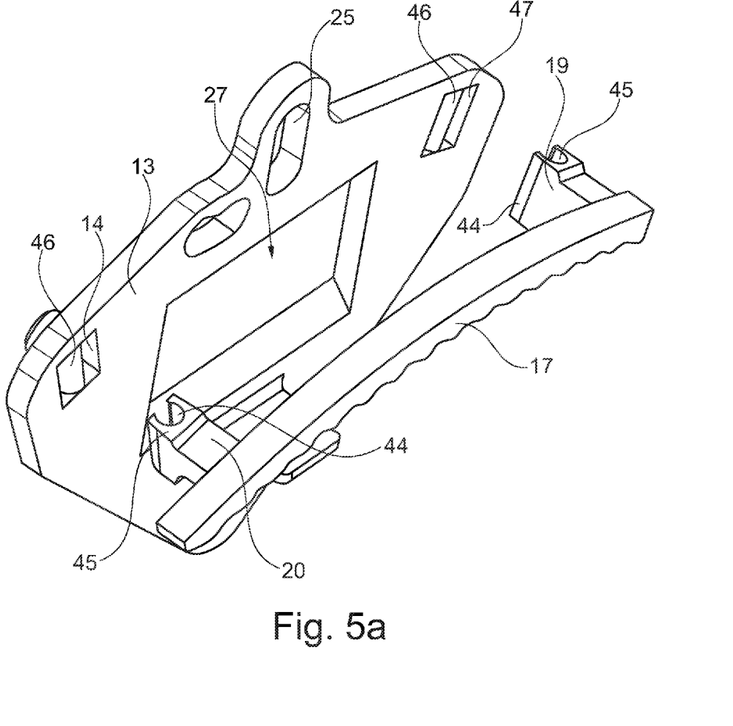
Figure 5B:
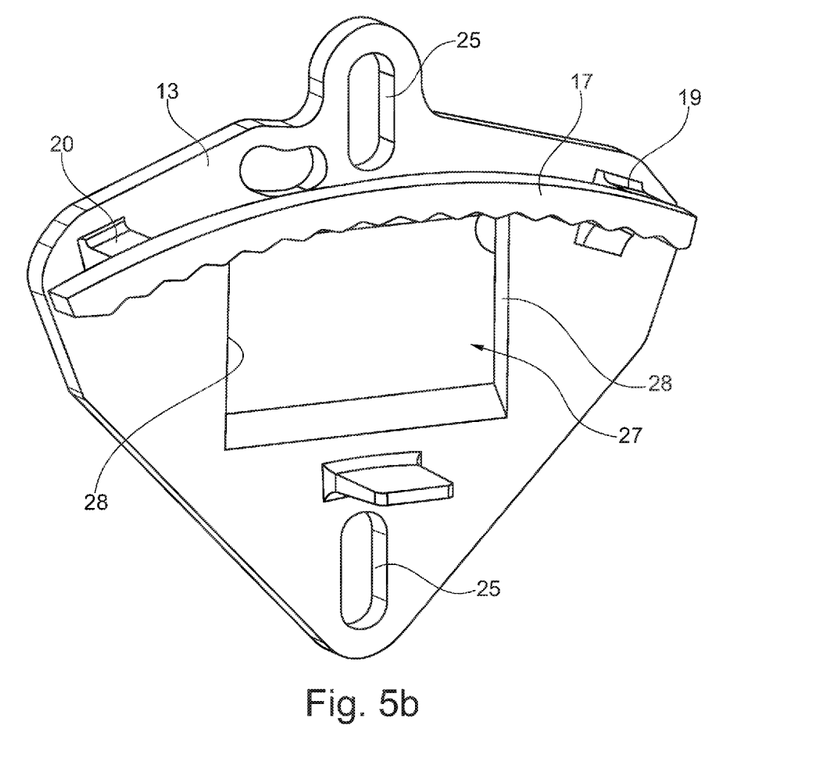

The arms 19, 20 are arranged at the two opposite ends of the first runner 17, in the rotational direction R, whereby the first runner 17 preferably has a prestressing by curvature of the first runner 17 that is convex to the sowing disk 40. The prestressing and curvature can be provided by the arrangement of the arms 19, 20 that can be clipped in particular to the holding plate 13 and/or by the corresponding shape of the first runner 17.

In addition, the first wiping element 11 has a receiving opening 27, arranged in particular between the slots 25, for receiving, guiding and fixing the second wiping element 12. The receiving opening 27 is designed as an essentially rectangular inside contour with two opposite guide surfaces 28 parallel to the radial direction of the sowing disk 40.

The second wiping element 12 is comprised of a second holding plate 14, onto which an in particular clipped second wiper 16 is attached. The second wiper 16 in particular has a second runner 18, which is attached via arms 21, 22 to the second holding plate 14. The second runner 18 essentially runs parallel to the first runner 17. In contrast to the first wiper 15, the second wiper 16 is arranged in particular in a middle third of the second runner 18, i.e., at a distance from the two opposite ends in the rotational direction of the sowing disk 40. In particular, the second wiper 16 has a convex prestressing and/or curvature preferably in the direction of the sowing disk 40.

The second wiping element 12 has two slots 26 that correspond in particular to the slots 25 of the first wiping element 11 and that preferably are arranged at the fastening means 24 for attachment to the half 3h of the sowing heart 3 and act in combination with the latter.

Between the slots 26, the second holding plate 14 has a shape 29, corresponding to the receiving opening 27, with parallel side walls 30. The side walls 30 act as glide surfaces for guiding the second wiping element 12 along the guide surfaces 28 of the first wiping element 11.

The second wiping element 12 accordingly also has two degrees of freedom analogously to the degrees of freedom of the first wiping element 11.

The first wiper 15 is removable by first fastening means at the first holding plate 13, and the second wiper 16 is removable by second fastening means at the second holding plate 14, attachable or attached, in particular clippable or clipped.

In each case, on the wiper side, the fastening means is comprised of parallel arms 44, 45 that face each other, and in each case, on the holding plate side, the fastening means is comprised of in particular rounded, preferably circular-cylindrical attaching profiles 46 that can be encompassed by the arms 44, 45. In particular, on the holding plate side, the fastening means have, moreover, in each case a recess 47 that accommodates the attaching profiles 46 and that limits the arms 44, 45 parallel to the holding plate 13, 14. This recess serves to limit the degrees of freedom of the connection between the wipers 15, 16 and the holding plates 13, 14 to a single degree of freedom orthogonal to the respective holding plate 13, 14 or to the sowing disk 40. The attaching profiles 46 are designed in particular in a rotationally symmetrical manner, preferably with an axis of rotation that is oriented or can be oriented radially to the sowing disk 40.

Figure 4A:
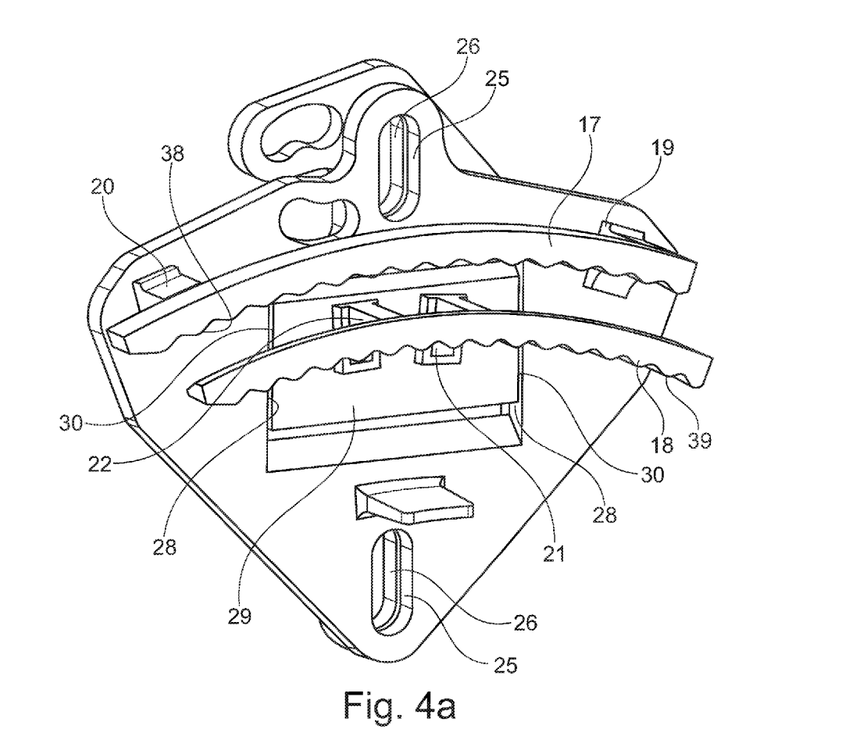
FIGS. 4a and 4b: Perspective views of the wiping device according to FIGS. 3a and 3b, and FIGS. 5a and 5b: Perspective views of the function of the wiping element according to the invention.
Figure 4B:
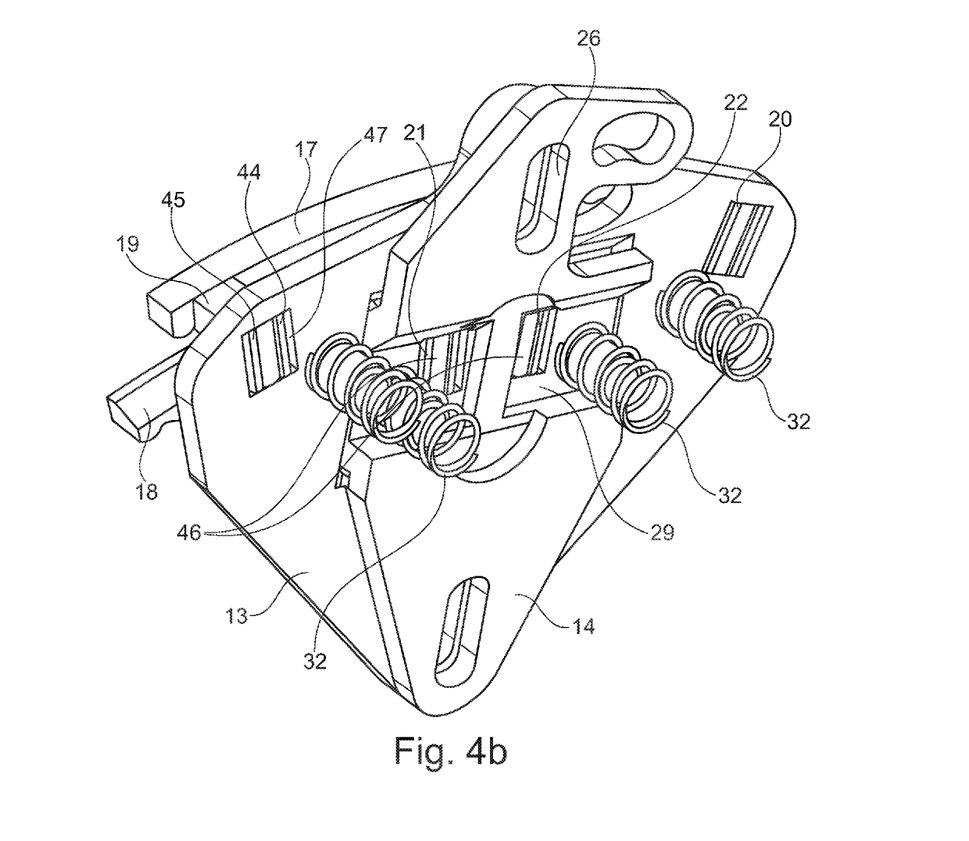

In FIG. 4b, it is shown that the first wiping element 11 and the second wiping element 12 at their sides facing away from the sowing disk 40 are spring-loaded in the direction of the sowing disk. Cylindrical pins 31 that project orthogonally in particular at the first holding plate 13 and the second holding plate 14, on which spiral springs 32 can be put, serve as spring means. In the installed state, the spiral springs 32 preferably rest against an inside wall of the half 3h of the sowing heart 3.

For adjusting the first wiping element 11 and the second wiping element 12 by means of the adjustment device 23, the first wiping element 11 has an in particular arc-shaped slot 33, in which a first actuator, designed in particular as an actuating pin 36 that rotates eccentrically around an actuating axis 35 of the adjustment device 23, is designed in an engaging manner.

The second wiping element also has an in particular bent slot 34 for receiving a second actuator of the adjustment device 23, rotating around the actuating axis 35 and designed in particular as a rotating actuating pin 37.

By the rotation of the actuating pins 36, 37, arranged eccentrically around the actuating axis 35, the wiping elements 11, 12 are movable by limiting their degrees of freedom in the radial direction and thus can be adjusted to one another if the actuating pins 36, 37 can be controlled separately from the adjustment device 26. The setting can also be done manually and can be attached in the desired position.

In this case, the positioning of the wiping elements 11, 12 is done in such a way that wiping edges 38, 39, in particular designed in a wavelike pattern, of the runners 17, 18 are directed past the sowing holes 41 during the rotation of the sowing disk 40 in such a way that seed adhering to the sowing holes 41 is singulated.

LIST OF REFERENCE SYMBOLS

1 Sowing aggregate
2 Arm
3 Sowing heart
3v Half
3h Half
4 Tank
4d Cover
4k Channel
5 Sowing coulter
6 Blade wheels
7 Coulter tip 8 Working space
9 Intake
10 Wiping device
11 First wiping element
12 Second wiping element
13 First holding plate
14 Second holding plate
15 First wiper
16 Second wiper
17 First runner
18 Second runner
19, 20 Arms
21, 22 Arms
23 Adjustment device
24 Fastening means
25 Slots
26 Slots
27 Receiving opening
28 Guide surfaces
29 Shape
30 Side walls
31 Pins
32 Spiral springs
33 Slot
34 Slot
35 Actuating axis
36 Actuating pin
37 Actuating pin
38 Wiping edge
39 Wiping edge
40 Sowing disk
41 Sowing holes
42 First sowing hole series
43 Second sowing hole series
44 Arms
45 Arms
46 Attaching profile
47 Recess
R Rotational direction

The invention claimed is:

1. Sowing heart for a single-grain sowing machine, said sowing heart comprising:
 a sowing disk rotatable in a rotational direction R, said sowing disk including:
  at least first and second series of sowing holes, arranged concentrically to the sowing disk, each series of sowing holes comprised of a plurality of sowing holes,
 a receiving area for receiving seed at the plurality of sowing holes,
 a dispensing area for dispensing the seed,
 a wiping device located in front of the dispensing area for singulating the seed at the plurality of sowing holes during operation of the sowing heart, said wiping device including:
  a first wiping element for the first series of sowing holes, said first wiping element having a first holding plate and a first wiper that is attached on the first holding plate, and
  a second wiping element for the second series of sowing holes, said second wiping element having a second holding plate and a second wiper that is attached on the second holding plate, wherein the second holding plate runs through the first holding plate, wherein the first and second wiping elements are coupled and are adjustable with respect to one another.

2. Sowing heart according to claim 1, wherein the first and second wiping elements are adjustable with respect to one another in the radial direction of the sowing disk parallel to the sowing disk.

3. Sowing heart according to claim 1, wherein the first and second wiping elements are spring-loaded in the axial direction of the sowing disk.

4. Sowing heart according to claim 1, wherein the first and second wiping elements are adjustable with respect to one another by a conversion of a rotational motion of an adjustment device into a translational motion of the first and second wiping elements in the radial direction of the sowing disk.

5. Sowing heart according to claim 1, wherein the second holding plate is guided to slide along the first holding plate in the radial direction of the sowing disk.

6. Sowing heart according to claim 1, wherein the first holding plate and/or the second holding plate at the reverse sides facing away from the first and second wipers have spring elements for spring-loading the first wiping element and/or the second wiping element.

7. Sowing heart according to claim 4, wherein the first holding plate has a first actuator intake for receiving a first actuator of the adjustment device, and the second holding plate has a second actuator intake for receiving a second actuator of the adjustment device.

8. Sowing heart according to claim 7, wherein the first actuator and/or the second actuator are arranged eccentrically rotatable on the adjustment device.

9. Sowing heart according to claim 1, wherein the first wiper has a first runner and is connected to the first holding plate by at least two arms that are separated from one another and/or the second wiper has a second runner and is connected to the second holding plate by at least two arms that are separated from one another.

10. Sowing heart according to claim 9, wherein the first runner and/or the second runner are prestressed relative to a plane defined by the sowing disk and/or each have a curvature.

11. Sowing heart according to claim 10, wherein the curvature is uniform along the first and second runners.

12. Sowing heart according to claim 2, wherein the first and second wiping elements are adjustable with respect to one another exclusively in the radial direction of the sowing disk parallel to the sowing disk.

13. Sowing heart according to claim 3, wherein the first and second wiping elements are spring-loaded together in the axial direction of the sowing disk.

14. Sowing heart according to claim 5, wherein the second holding plate is guided to slide along the first holding plate with an outside contour of the second holding plate at an inside contour of the first holding plate.

15. Sowing heart according to claim 8, wherein the first and second actuators are controlled separately.

16. Sowing heart according to claim 10, wherein the first runner and the second runner are prestressed such that the first and second runners are convex, facing outward in a radial direction of the sowing disk.

17. Sowing heart according to claim 10, wherein the first runner and/or the second runner each have a curvature such that the first runner and/or the second runner are convex, facing outward in a radial direction of the sowing disk.

18. Wiping device for singulating seed at the sowing holes of a sowing disk of a sowing heart during the operation of the sowing heart, said wiping device comprising:
- a first wiping element for a first series of sowing holes of the sowing disk, wherein the first wiping element has a first holding plate and a first wiper that is attached on the first holding plate, and
- a second wiping element for a second series of sowing holes of the sowing disk, wherein the second wiping element has a second holding plate and a second wiper that is attached on the second holding plate, wherein the second holding plate runs through the first holding plate,
- wherein the first and second wiping elements can be coupled and are adjustable with respect to one another.

19. Single-grain sowing machine with at least one wiping device according to claim 18.

* * * * *